(12) United States Patent
Peterson (10) Patent No.: US 6,315,243 B1
(45) Date of Patent: Nov. 13, 2001

(54) REGIONAL AIRCRAFT BOARDING PIER AND METHOD OF USING

(76) Inventor: Robert L. Peterson, 2190 E. 3205 South, Salt Lake City, UT (US) 84109

( * ) Notice: Subject to any disclaimer, the term of this patent is extended or adjusted under 35 U.S.C. 154(b) by 0 days.

(21) Appl. No.: 09/575,222

(22) Filed: May 22, 2000

Related U.S. Application Data

(60) Provisional application No. 60/141,038, filed on Jun. 24, 1999.

(51) Int. Cl.[7] ........................................................ B64F 1/32
(52) U.S. Cl. .................................. 244/114 R; 52/32; 52/33
(58) Field of Search ............................. 244/114 R; 52/32, 52/33

(56) References Cited

U.S. PATENT DOCUMENTS

| | | | | |
|---|---|---|---|---|
| 1,894,528 | * | 1/1933 | Zimmerman | 244/144 R |
| 2,470,696 | * | 5/1949 | Gonzalez et al. | 244/144 R |
| 3,571,990 | * | 3/1971 | Rossman | 244/114 R |
| 4,218,034 | * | 8/1980 | Magill | 244/144 R |

OTHER PUBLICATIONS

"Traffic Growth Swamps Airport Facilities", Aviation Week and Space Technology, Oct. 31, 1966.*

* cited by examiner

*Primary Examiner*—J. Woodrow Eldred
(74) *Attorney, Agent, or Firm*—Steven L. Nichols; Parsons Behle & Latimer (57) ABSTRACT

A regional aircraft boarding pier can be provided at an airport concourse in place of one or two conventional large aircraft boarding bridges. The regional aircraft boarding pier includes a primary passenger bridge between the airport concourse and a hub. A number of secondary passenger bridges extend from the hub to individual regional aircraft. In this way, an equivalent number of passenger seats can be serviced as between large and regional aircraft, and large and regional aircraft can be docked at a common airport terminal. Consequently, passengers can more efficiently and conveniently transfer between connecting flights that are on both large and regional aircraft. The hub of the boarding pier can take a number of configurations to optimally use the space available. The hub can also support large aircraft boarding bridges as well as the secondary passenger bridges docked to smaller, regional aircraft.

36 Claims, 9 Drawing Sheets

REGIONAL AIRCRAFT BOARDING PIER AND METHOD OF USING

RELATED APPLICATION

This is the utility application filing based upon U.S. Provisional Application Ser. No. 60/141,038 filed Jun. 24, 1999.

FIELD OF THE INVENTION

The present invention relates to the field of airline travel. More particularly, the present invention relates to the field of aircraft boarding piers, specifically to aircraft boarding piers servicing smaller, regional aircraft. The present invention provides among other things the integration of a regional aircraft boarding pier in an airport concourse with existing bridges for larger jet passenger aircraft.

BACKGROUND OF THE INVENTION

Air travel has becoming increasing popular over the past decade and has evolved to handle an ever growing passenger volume. An important aspect of this evolution is the structure of flight routes through a "hub" airport. Today, hub routing has become an essential part of the efficient operation of an airline.

This trend has been aided by the advent of regional aircraft. As used herein, the term "regional aircraft" refers to jet or propeller aircraft that are smaller than typical large commercial airline passenger jets and are used to service regional, as opposed to national, passenger routes. Regional aircraft will typically be identified as having about 110 seats or less. Aircraft with substantially more than 110 seats and which are used to travel traditional airline routes between major airports are considered "large aircraft" or "large jets" herein. The advent of regional aircraft has created a new market for air travel in which air passengers can span relatively large distances quickly on a regional aircraft at the end or beginning of a trip while using a larger jet to cover the bulk of the trip mileage.

Manufacturers of regional aircraft, particularly craft with 50 or fewer seats, include Brazilian aircraft maker Embraer SA, Canada's Bombardier and Fairchild Aerospace of the United States. The popularity of regional aircraft produced by these manufacturers has exceeded expectations. For example, Bombardier forecast initial sales of 400 aircraft when it launched its regional jet model in the early 1990s. Bombardier instead received orders and options for 1,066 of its CRJ-200 50-seater and larger CRJ-700 derivative. Similarly, Embraer booked dozens more orders than expected for its ERJ-135 and ERJ-145 aircraft at a recent Paris airshow.

Capitalizing on this strong commercial interest, Bombardier has launched the CRJ-700, a 70-seat aircraft, and plans an even larger BRJ-X model with 90 or 110 seats. Fairchild has recently launched the 70-seat 728JET and also offers a longer version with around 100 seats. Embraer has also booked orders for its new ERJ-170 and ERJ-190, with about 70 and 100 seats, respectively.

One problem with regional aircraft travel is that the regional aircraft terminal is often located at a site remote from the main terminal. Consequently, a passenger on a regional aircraft, whether transferring to or from a large aircraft, needs to traverse the length of the airport and/or travel between terminals to make the transfer. As air travel becomes increasingly popular and important to the economy, the frequent regional aircraft passenger represents an increasing share of the air travel market. Consequently, a significant problem is presented by the remote location of the regional aircraft terminal which prevents quick and seamless plane transfers for the regional aircraft passenger. Additionally, the remote location of the regional aircraft terminal also affects airline scheduling for large aircraft because passengers must be allowed time to traverse the often large distances between a regional aircraft boarding gate and the boarding gate for the large aircraft.

Another problem with regional aircraft travel is that the passenger is frequently required to walk outside on the tarmac and climb stairs to board the regional aircraft. If the weather is inclement, boarding and deplaning from a regional aircraft is made more difficult than boarding and deplaning from large aircraft entirely within the closed and conditioned space of conventional airports which have been developed for large aircraft.

Where a passenger is unable to walk, boarding a regional aircraft from the tarmac in a wheelchair can present additional problems. In the past, these problems have been addressed by building some kind of wheelchair lift. However, such boarding is often time consuming and can be a source of embarrassment or self-consciousness for the wheelchair passenger. The combination of a wheelchair lift and inclement weather may make the prospect of regional aircraft travel even less acceptable for disabled passengers.

Consequently, there is a need in the art to make regional aircraft travel more convenient and efficient. Specifically, as regional aircraft become more prevalent, a need exists to integrate terminals and boarding gates for the regional aircraft with terminals and boarding gates for large aircraft in a manner that overcomes the problems of the prior art.

SUMMARY OF THE INVENTION

It is an object of the present invention to meet the above-described needs and others. Specifically, it is an object of the present invention to provide a method and system for integrating terminals and boarding gates for regional aircraft with terminals and boarding gates for large aircraft in a manner that overcomes the problems of the prior art.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve these stated and other objects, the present invention may be embodied and described as a regional aircraft boarding pier which can be integrated or retrofit into a common airport terminal or concourse which also has conventional boarding bridges for large aircraft. In a preferred embodiment, the regional aircraft boarding pier of the present invention includes a primary passenger bridge connecting a traditional airport concourse with a hub chamber. From the hub a number of secondary passenger bridges radiate outward. Each secondary passenger bridge services a particular regional aircraft. Each secondary passenger bridge has a length and a width that are smaller than that of the primary passenger bridge.

The present invention also encompasses a method of integrating boarding facilities for a number of regional aircraft and large jets in a single airport concourse. The method includes, providing an airport concourse with a number of conventional large jet passenger bridges that are connected to the concourse. The large jet passenger bridges have a traditional elevation above the tarmac that is continuously adjustable to match the sill height of a variety of large jets. Under the present invention, this method further includes constructing at least one regional aircraft boarding pier connected to the same concourse. The regional aircraft boarding pier is structured as set forth above.

This method of integrating boarding facilities for regional aircraft and large jets in a single airport concourse may be used with a variety of airport concourse configurations. For example, the common concourse supporting both large and regional aircraft boarding facilities may be an elongated structure attached to a network of additional concourses. Alternatively, the common concourse may be, or be part of, a midfield terminal. Such a midfield terminal may be elongated or circular.

The present invention also encompasses the method of retrofitting an existing airport concourse with at least one regional aircraft boarding pier as described above. The method preferably includes replacing two adjacent large jet passenger bridges with a regional aircraft boarding pier that has the same structure as set forth above.

The present invention also encompasses a method of transferring air passengers between at least one regional aircraft and a large jet or another regional aircraft. The method allows for air passengers to transfer between a regional aircraft and a large jet or between two regional aircraft without climbing stairs to the aircraft from the tarmac and without walking out of the enclosed controlled atmosphere of the airport. The method includes providing an airport concourse and docking at least one large jet to a large jet passenger bridge that is connected to the concourse. The method continues by docking at least one regional aircraft to a regional aircraft boarding pier that is connected to the same concourse. The regional aircraft boarding pier has the inventive structure as set forth above.

A passenger then transfers either between the large jet and the regional aircraft, or between the regional aircraft and another regional aircraft. Consequently, the passenger can switch aircraft, including a switch between a large jet and a regional aircraft, without leaving the concourse. This prevents the passenger from experiencing either inclement weather or having to use a wheelchair lift to reach the airplane. This also prevents the passenger from having to traverse a great distance between connecting flights as both large and regional aircraft can be docked at the common concourse.

The present invention also encompasses a system of docking regional aircraft. The system of docking regional aircraft includes at least one regional aircraft boarding pier that has at hub, a number of regional aircraft passenger bridges connected to and radiating from the hub, and a number of regional aircraft respectively docked at the regional aircraft passenger bridges. This system of docking regional aircraft may further include a concourse passenger bridge connecting the pier hub to an airport concourse.

BRIEF DESCRIPTION OF THE DRAWINGS

The accompanying drawings illustrate the present invention and are a part of the specification. Together with the following description, the drawings demonstrate and explain the principles of the present invention.

In the drawings, identical reference numbers indicate identical items and/or structural elements, regardless of the level of detail provided in any individual drawing.

DETAILED DESCRIPTION OF THE PREFERRED EMBODIMENTS

Using the drawings, the preferred embodiments of the present invention will now be explained. In this explanation, as above, a "large aircraft" is an aircraft with substantially more than 110 passenger seats. Large aircraft can be either jet or propeller driven. Examples of large aircraft include the DC-9 or Boeing 717 at the smaller end of the scale, up to the Boeing 747 or 767 at the larger end of the scale. A "regional aircraft" is an aircraft with a passenger capacity from about 6 to about 110 passengers. Examples of regional aircraft include aircraft made by LM Bombardier, Embraer, Fairchild Aerospace, Gulf Stream, Cessna, Learet, and others.

Under a preferred embodiment of the present invention, many of the problems of the prior art can be overcome with a regional aircraft boarding pier, described in detail below, which is integrated into a common concourse with boarding facilities for large aircraft. As used herein, a "concourse" is a single structure or wing of an airport with sequentially numbered boarding gates for passenger aircraft. The term airport "terminal" is synonymous with concourse or denotes a group of interconnected concourses.

Figure 1:
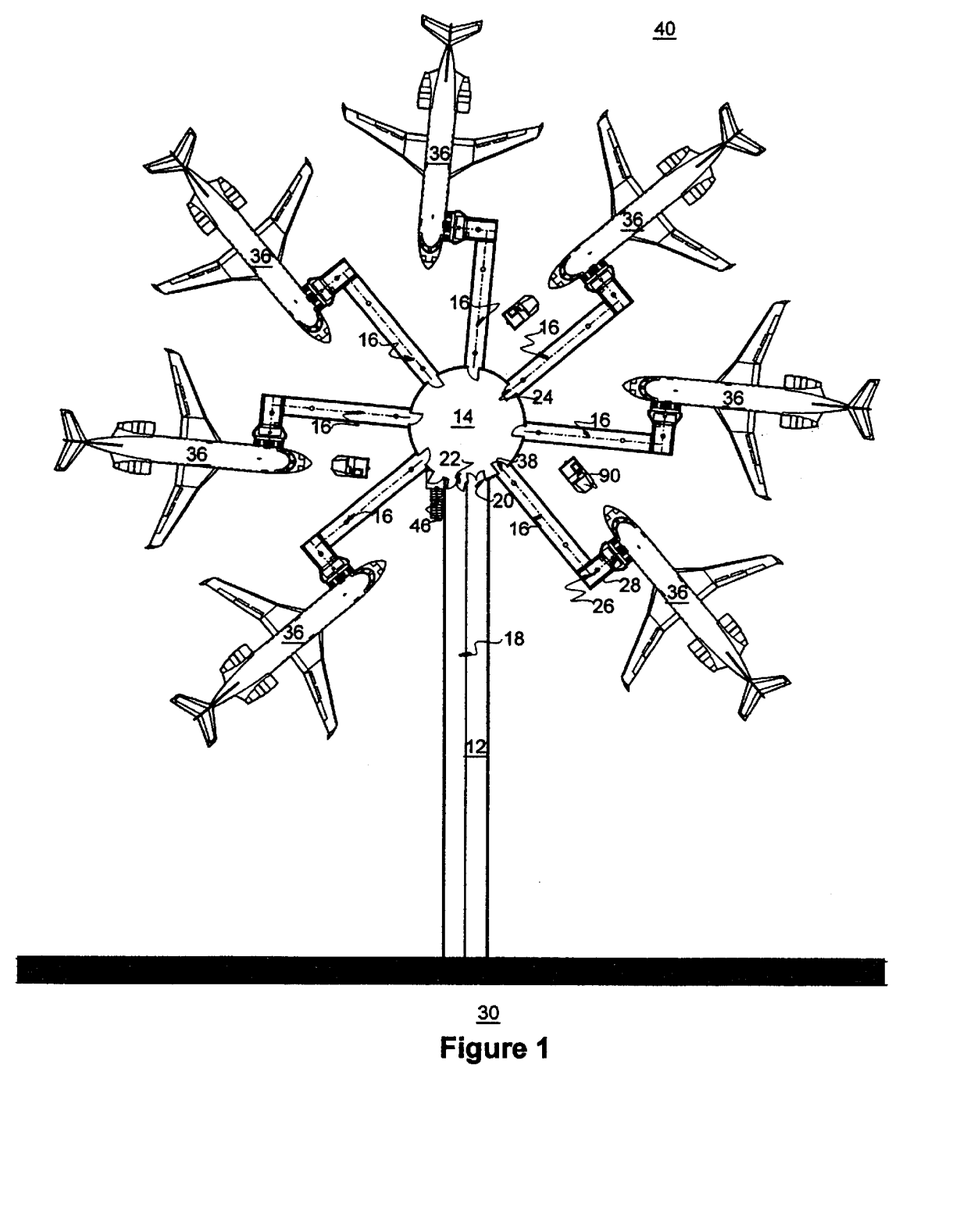
FIG. 1 is plan view of the regional aircraft boarding pier according to the present invention with a plurality of regional aircraft docked thereto.

FIG. 1 is plan view of a regional aircraft boarding pier according to the present invention. As shown in FIG. 1, the regional aircraft boarding pier (10) includes a primary regional aircraft passenger bridge (12). The primary regional aircraft passenger bridge (12) has an appropriates length and width to allow passengers to move between the airport terminal or concourse (30) and the docked aircraft. A divider rail (18) may be placed within the primary regional aircraft passenger bridge (12) to allow for simultaneous passenger boarding and deplaning without interference between the two groups of passengers.

A hub (14) is connected to the primary regional aircraft passenger bridge (12). A number of secondary regional aircraft passenger bridges (16) are connected to and radiate outward from the pier hub (14). Each secondary regional aircraft passenger bridge (16) has an appropriate length and width to allow passengers to move through the bridge (16) to and from a regional aircraft (36). The length and width of the secondary bridges (16) is preferably smaller than those dimensions of the primary passenger bridge (12).

Each secondary regional aircraft passenger bridge (16) may dock a regional aircraft (36), thereby connecting the aircraft (36) to the hub (14), primary bridge (12) and, ultimately, the airport concourse or terminal (30). The docking portion (26) of each secondary bridge (16) may include a flexible accordion connector (28) to provide a weather-tight fit against the side of the aircraft (36). An emergency exit stairway (46) is preferably connected to hub (14) to allow for immediate egress to the tarmac in the event of an emergency.

In order to accommodate differently sized regional aircraft, the ends (26) of the secondary bridges (16) that dock with the regional aircraft (36) can preferably be adjusted up and down in elevation relative to the tarmac (40). Therefore, the regional aircraft boarding pier (10) is a fixed, elevating structure. Consequently, no tarmac drive is used to dock the aircraft. Alternatively, a tarmac or apron drive may be used with a regional aircraft boarding pier (10) of the present invention.

Because the opposite ends (22) of the secondary bridges (16) are pivotally attached to the hub (14), adjusting the elevation of the docking end (26) of the bridges (16) alters the slope or pitch of the bridge. Preferably, the bridge (16) is maintained with a pitch in the range from level to having a one foot of rise or fall for every 12 feet of run. More preferably, the pitch is kept at one foot of rise or fall, or less, for every 20 feet of run. As necessary, the secondary bridges (16) may be pitched outside the preferred range under the principles of the present invention. Where the preferred pitch range is exceeded, hand railings may be installed within each such bridge (16).

Each secondary regional aircraft passenger bridge (16) preferably has a length from about 20 feet to about 80 feet. Most preferably, the length of the bridges (16) is about 40 feet. The, width of the secondary regional aircraft passenger bridges (16) is preferably in the range from about four feet to about ten feet. Most preferably, the width of the bridges (16) is about six feet.

The length of the primary regional aircraft passenger bridge (12) is preferably in the range from about 60 feet to about 300 feet. Most preferably, the length is about 180 feet. Other lengths may be preferred depending upon the specific size and configuration of the particular regional aircraft being docked, perhaps as compared with other regional aircraft also being docked.

The pitch for the primary regional aircraft passenger bridge (12) is preferably in the range from level to about one foot of rise or fall for every 12 feet of run. Preferably, the pitch of the primary bridge (12) is about one foot of rise for every 20 feet of run. The preferred width for the primary regional aircraft passenger bridge (12) is about 12 to 20 feet. Most preferably, the width of the primary bridge (12) is about 16 feet.

The hub (14) has an elevation above the tarmac (40) in the range from about two feet to about eight feet. To accommodate wheeled access from ground level, the hub (14) may have an elevation from zero to two feet above the tarmac (4). However, if the hub (14) is situated at ground level, the general length of the secondary bridges (16) will most likely have to be increased to accommodate the rise to the sill height or entry level of a regional aircraft. Consequently, the hub (14) has a preferred elevation of about six feet above the tarmac (40).

Figure 2:
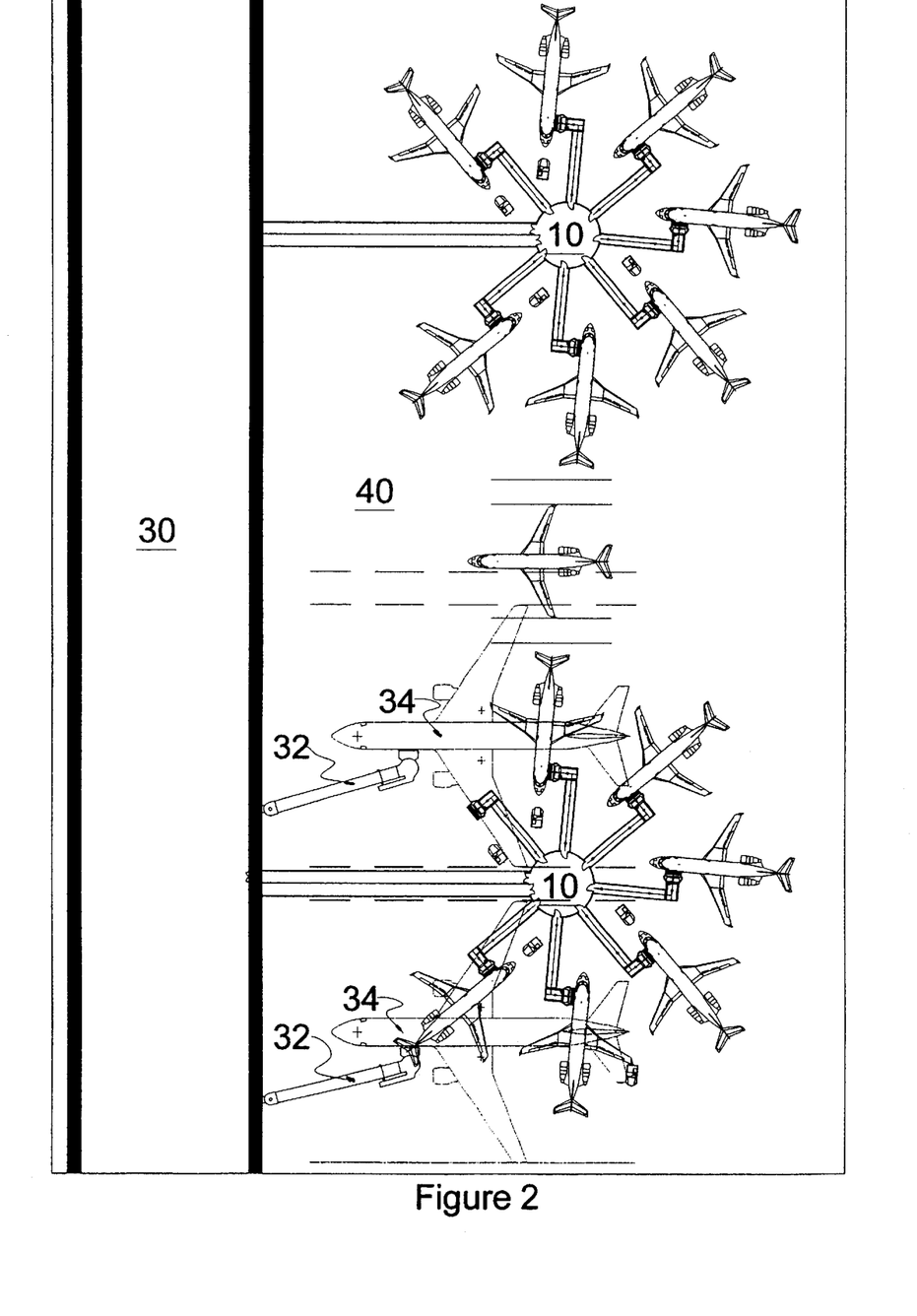
FIG. 2 is plan view of the integration of a regional aircraft boarding pier with a concourse that services large aircraft according to the present invention.

FIG. 2 is plan view illustration of the integration of a regional aircraft boarding pier (10) with a concourse (30) that may also service, or previously serviced, large aircraft (34). As shown in ghost in FIG. 2, a number of large aircraft passenger bridges (32) are provided from the airport concourse (30). As shown in FIG. 2, each large aircraft passenger bridge (32) services a single large aircraft (34).

A retrofit of the existing concourse (30), carried out according to the present invention, preferably replaces two of the large aircraft passenger bridges (32) for large aircraft (34) with a regional aircraft boarding pier (10) for a number of regional aircraft (36). The large passenger bridges (32) and large aircraft (34) which have been replaced are illustrated in ghost in FIG. 2. As will be appreciated by those skilled in the art, the concourse (30) may continue to have a number of large aircraft passenger bridges (32) even after the retrofit installs a regional aircraft boarding pier (10) according to the present invention. (See FIG. 3).

Under this retrofitting method of the present invention, it is also possible to remove only a single large aircraft bridge (32) and replace that bridge (32) with a single regional aircraft boarding pier (10) of the present invention. However, this will likely require greater length in the, primary bridge (12) of the pier (10) in order to avoid interference with adjacent boarding facilities. Consequently, removing at least two adjacent large jet passenger bridges (32) is preferred to make room for a single regional aircraft boarding pier (10). FIG. 2 shows the superimposition of the regional aircraft boarding pier (10) over the same real estate on the tarmac (40) as previously occupied by two large jet service areas.

Under the principles of the present invention, the hub (14) of the regional aircraft boarding pier (10) may have a variety of different configurations. Preferably, the hub (14) is a circular structure with a minimum width in the range from about ten to about 40 feet. More preferably, the hub (14) has a minimum width of about 20 feet, although it need not be circular.

Figure 3:
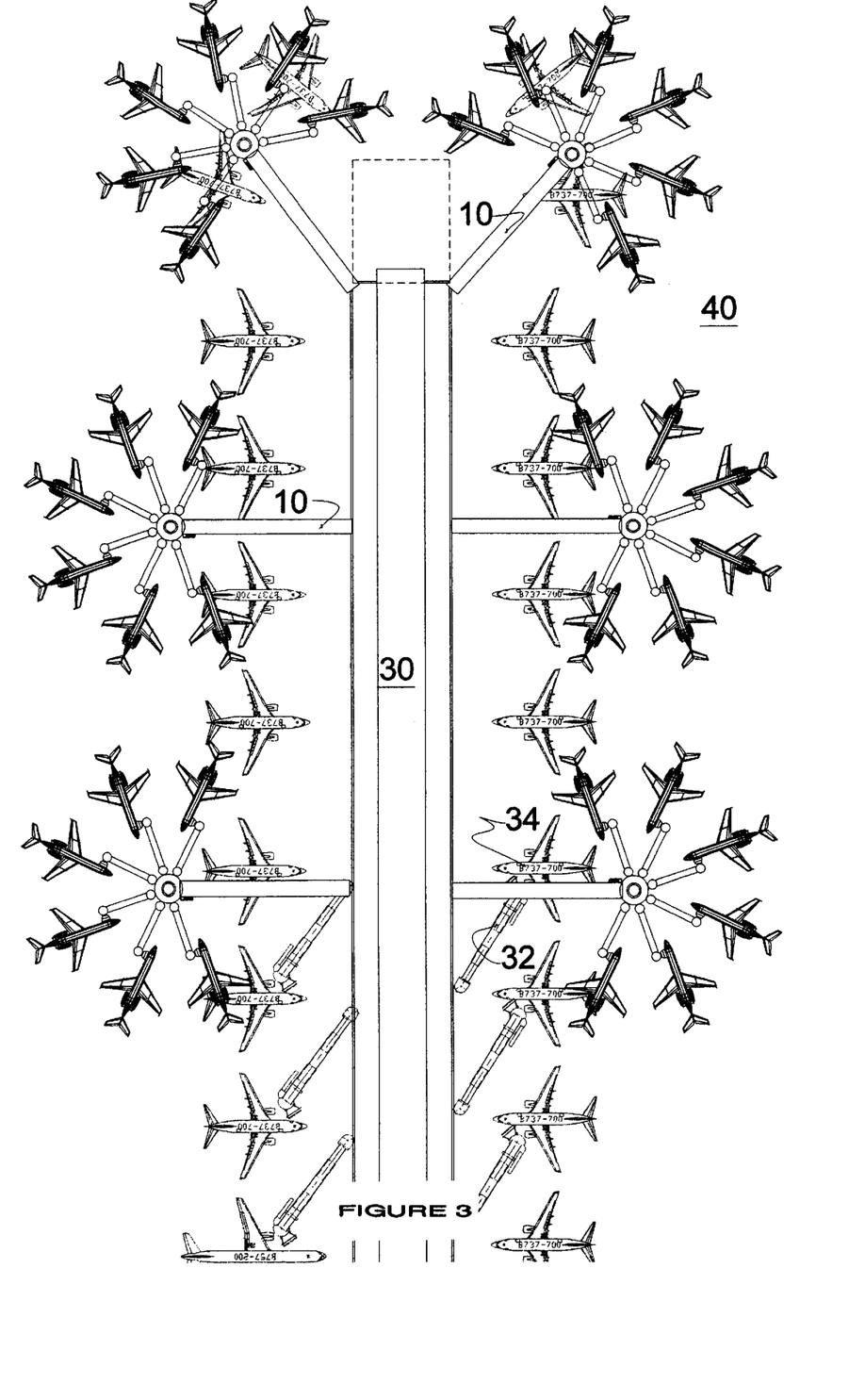
FIG. 3 is a plan view of a concourse according to the present invention in which a number of regional aircraft boarding piers have replaced passenger bridges for larger aircraft, with some passenger bridges for larger aircraft remaining such that both large aircraft and regional aircraft can be docked and loaded at the same concourse.

FIG. 3 further illustrates the concourse (30) where some of the large aircraft passenger bridges (32) that service large aircraft (34) have been replaced by regional aircraft boarding piers (10) according to the present invention. FIG. 3. shows the regional aircraft boarding piers (10) superimposed over the real estate previous occupied by large aircraft service areas. As shown in FIG. 3, equivalent building frontage is occupied by the regional aircraft boarding layout as compared to a comparable large jet parking layout.

Significantly, FIG. 3 also shows large aircraft bridges (32) servicing large aircraft (34) from the same concourse (30) as that to which the regional aircraft boarding piers (10) are connected. Consequently, as noted above, under the principles of the present invention, a single concourse (30) can be made to service both large and regional aircraft.

Referring again to FIG. 1, the optimal density of secondary passenger bridges (16) will now be discussed. As shown in FIG. 1, the present invention may provide, for example, seven secondary regional aircraft passenger bridges (16) from a circular hub (14). A regional aircraft pier with six or seven secondary bridges (16) is the preferred configuration so as to maximize the number of regional aircraft (36) that can be docked through the hub (14).

If, however, the operational area for constructing the regional aircraft boarding pier (10) and servicing regional aircraft (36) is restricted to closer to the concourse (30), the number of secondary regional aircraft passenger bridges (16) may be reduced so that the primary bridge (12) can be shortened. In FIG. 1, the reduction in the number of secondary bridges (16) would preferably be accomplished by removing the two bridges (16') closest to the concourse (30) and the aircraft (36') docked thereto. With only five remaining secondary bridges (16) connected to the hub (14), the primary regional aircraft passenger bridge (12) can be substantially shortened to accommodate available space.

The regional aircraft boarding pier (10) illustrated in FIG. 1 has an operational footprint that occupies an area of about 360 feet by about 360 feet. The operational footprint refers to the space around the regional aircraft boarding pier (10) within which regional aircraft may move. Typically, the allowable size of the operational footprint around the regional aircraft boarding pier (10) is determined by the regulations of the Federal Aviation Administration (FAA) or its counterpart agencies in countries other than the United States. In some preferred embodiments, the footprint of the regional aircraft boarding pier (10) may occupy a smaller area, for example, 150 ft by about 300 ft.

The building frontage required by the regional aircraft boarding pier (10) is also reduced per passenger seat by the present invention. Preferably, the regional aircraft boarding pier (10) occupies an operational building frontage of about 360 feet.

Returning to FIG. 2, where a regional aircraft boarding pier (10) according to the present invention is substituted for two existing large aircraft bridges (32), it is desirable to avoid any decrease is passenger capacity. In other words, the number of seats on the regional aircraft (36) docked at the pier (10) should be roughly equal to the number of seats on two large aircraft so that the regional aircraft boarding pier (10) services an equivalent number of regional aircraft passenger seats in about the same tarmac area and building frontage occupied as would have been serviced by two large aircraft passenger bridges (32) connecting to two wide-body large aircraft. Consequently, the regional aircraft boarding pier (10) preferably services about 400 to 500 regional aircraft passenger seats distributed among approximately six or seven regional aircraft.

Figure 4:
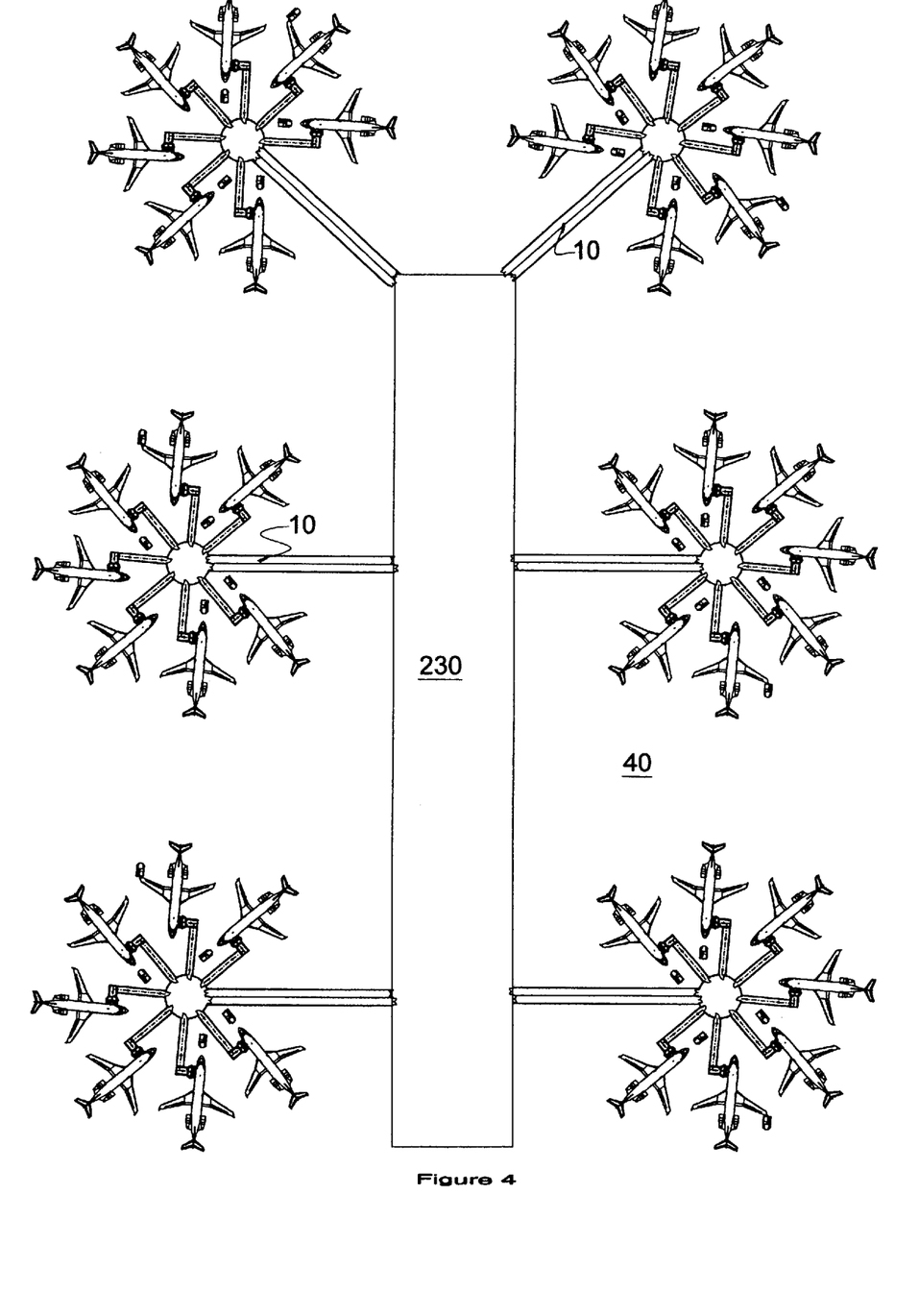
FIG. 4 is a plan view of an embodiment of the present invention in which a number of regional aircraft boarding piers are attached to a rectangular concourse.
Figure 5:
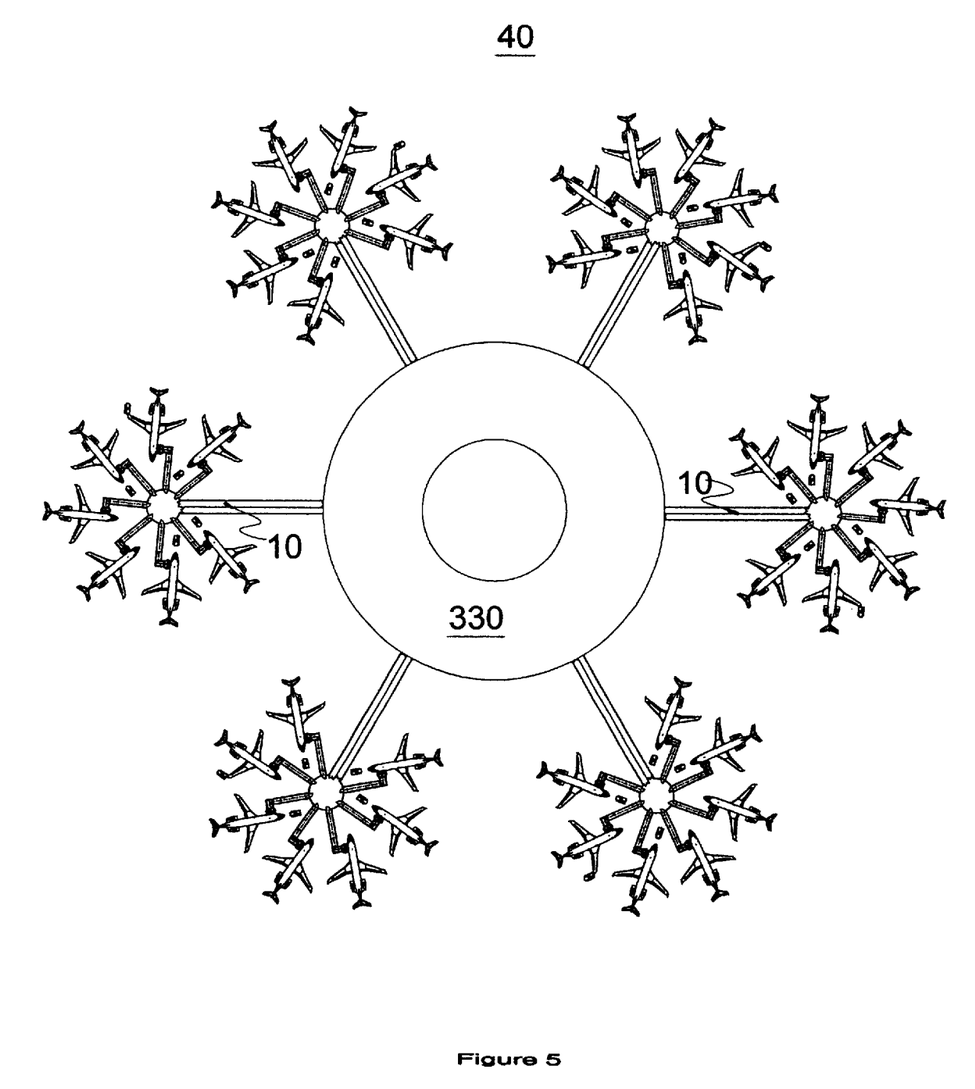
FIG. 5 is a plan view of an embodiment of the present invention in which a number of regional aircraft boarding piers are attached to a circular concourse.

FIG. 4 illustrates a number of regional aircraft boarding piers (10) according to the present invention which are connected to an elongated airport concourse (230). FIG. 5 illustrates a number of the regional aircraft boarding piers (10) according to the present invention which are connected to a circular airport concourse (330). The regional aircraft piers (10) of the present invention can be used with any concourse or terminal configuration. Either concourse, the rectangular (230) or circular (330), may be a midfield concourse or may be structurally connected to a larger concourse network. Alternatively, the concourse, either midfield or networked, may be a curved structure.

Figure 6:
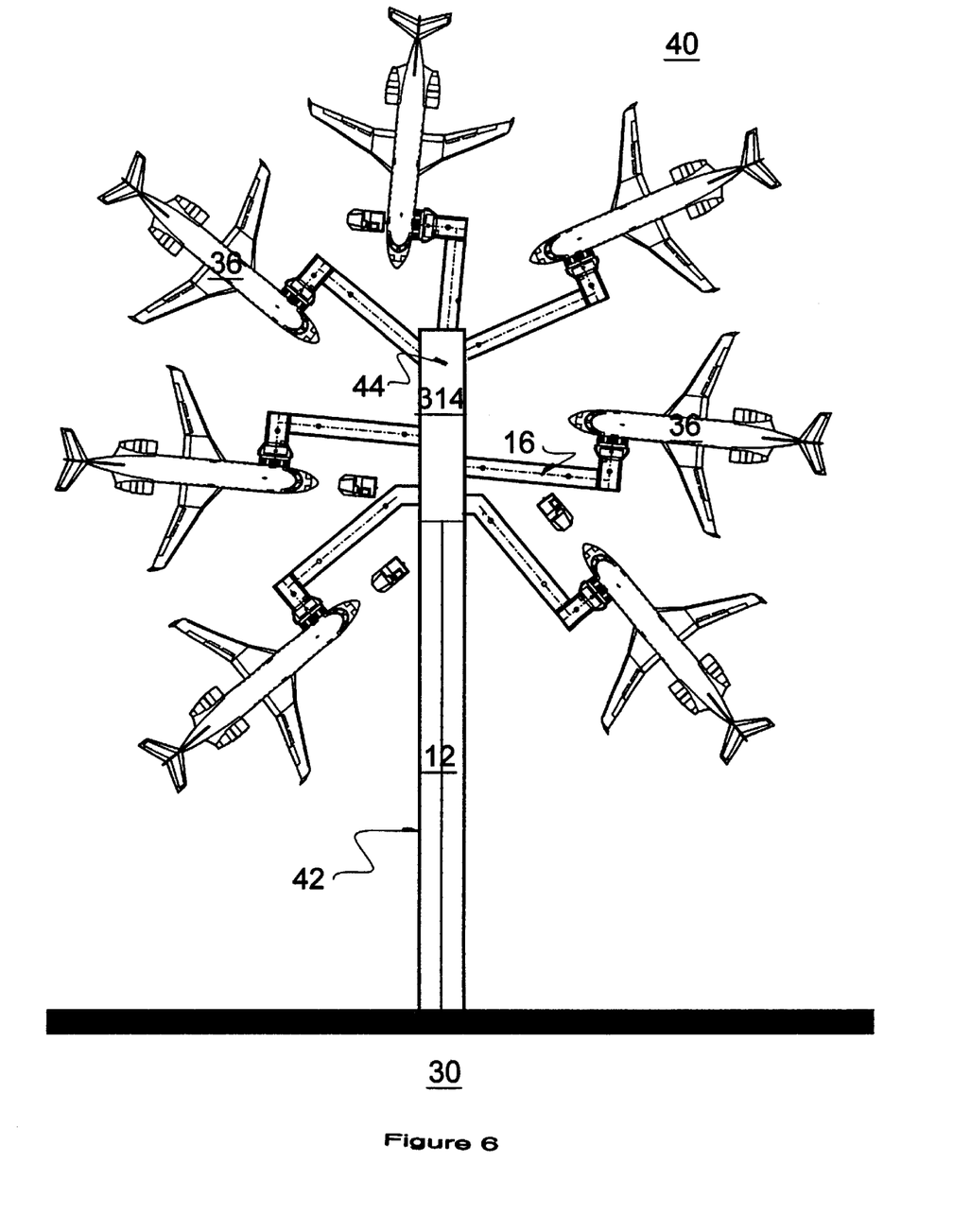
FIG. 6 is plan view of an embodiment of the present invention in which a hub supporting a number of regional aircraft boarding bridges has an elongated configuration.

Alternative hub configurations for the regional aircraft pier of the present invention will now be discussed. FIG. 6 is plan view of another embodiment of the present invention in which the hub (314) between the primary bridge (12) and the secondary bridges (16) has an elongated configuration. As shown in FIG. 6, the primary regional aircraft passenger bridge (12) and the hub (314) may have parallel elongated walls (42) and (44), respectively. The width of the hub (314) may be the same as the primary bridge (12) or may be wider to better accommodate passenger movement between secondary bridges (16).

Figure 7:
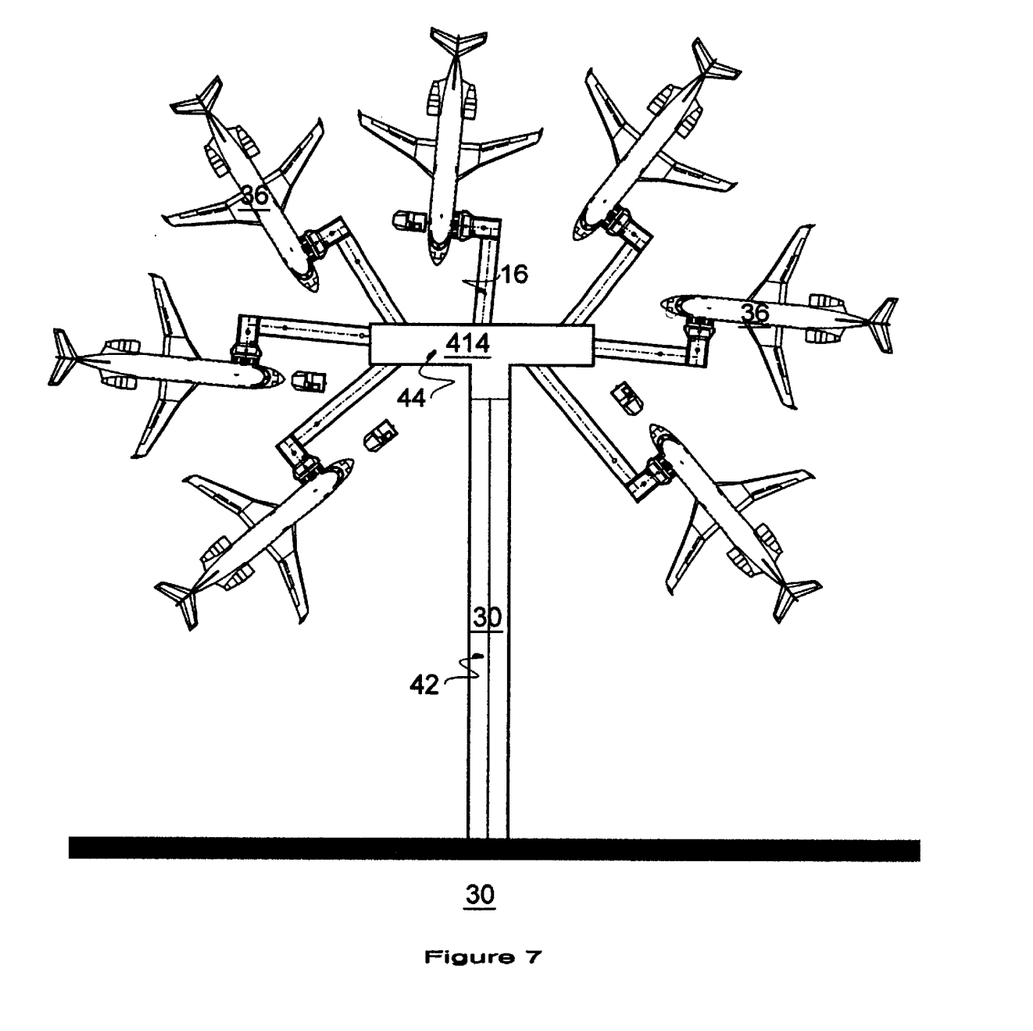
FIG. 7 is a plan view of an embodiment of the present invention in which a hub supporting a number of regional aircraft boarding bridges has an elongated configuration that is situated orthogonal to a principal passenger bridge.

FIG. 7 is a plan view of still another embodiment of the present invention in which the hub (414) has an elongated configuration that is arranged orthogonally to the primary regional aircraft passenger bridge (12). The primary regional aircraft passenger bridge (12) and hub (414) have orthogonal elongated walls (42) and (44), respectively. While in the preferred embodiment of FIG. 7, the elongated hub (414) is orthogonal to the primary passenger bridge (12), the elongated hub (414) could be disposed at any non-zero angle with respect to the primary passenger bridge (12) to accommodate existing structures and obstacles.

Figure 8:
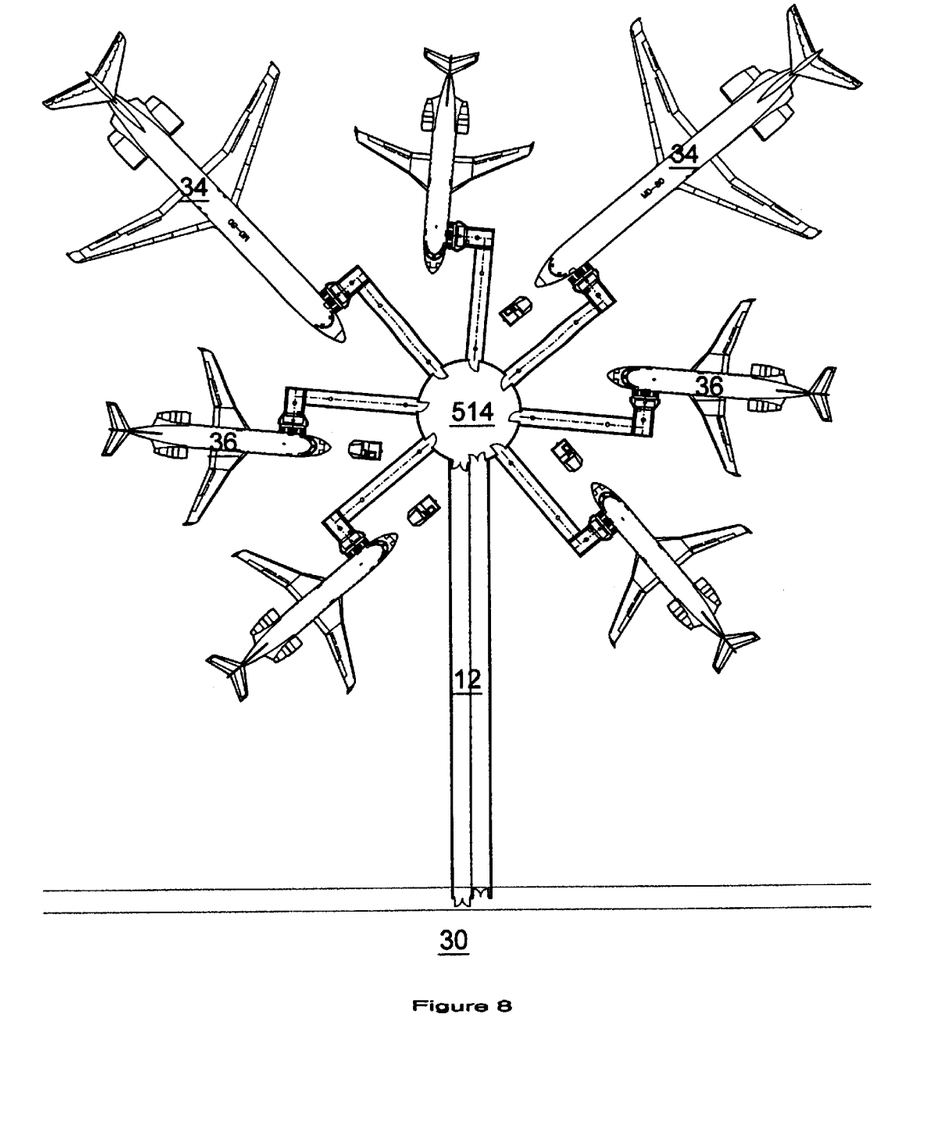
FIG. 8 is a plan view of an embodiment of the present invention in which the boarding, pier includes accommodation for large aircraft or larger regional aircraft.

FIG. 8 illustrates another method encompassed by the present invention in which large and regional aircraft can be serviced at the same concourse. As shown in FIG. 3, both regional aircraft piers (10) and large aircraft bridges (32) can be provided from a common concourse (30) to support, respectively, regional and large aircraft. Additionally, as shown in FIG. 8, the aircraft pier (10) of the present invention can, in a second embodiment, include a hub (514) from which extend both secondary bridges (16) for docking regional aircraft (36) and large aircraft bridges (32) for docking large aircraft (34). In order to accommodate large aircraft bridges (32), the number of secondary bridges (16) on the hub (514) can be reduced or the length of the large aircraft bridges (32) can be extended to allow the interspersing of large and regional aircraft as shown, for example, in FIG. 8.

Figure 9:
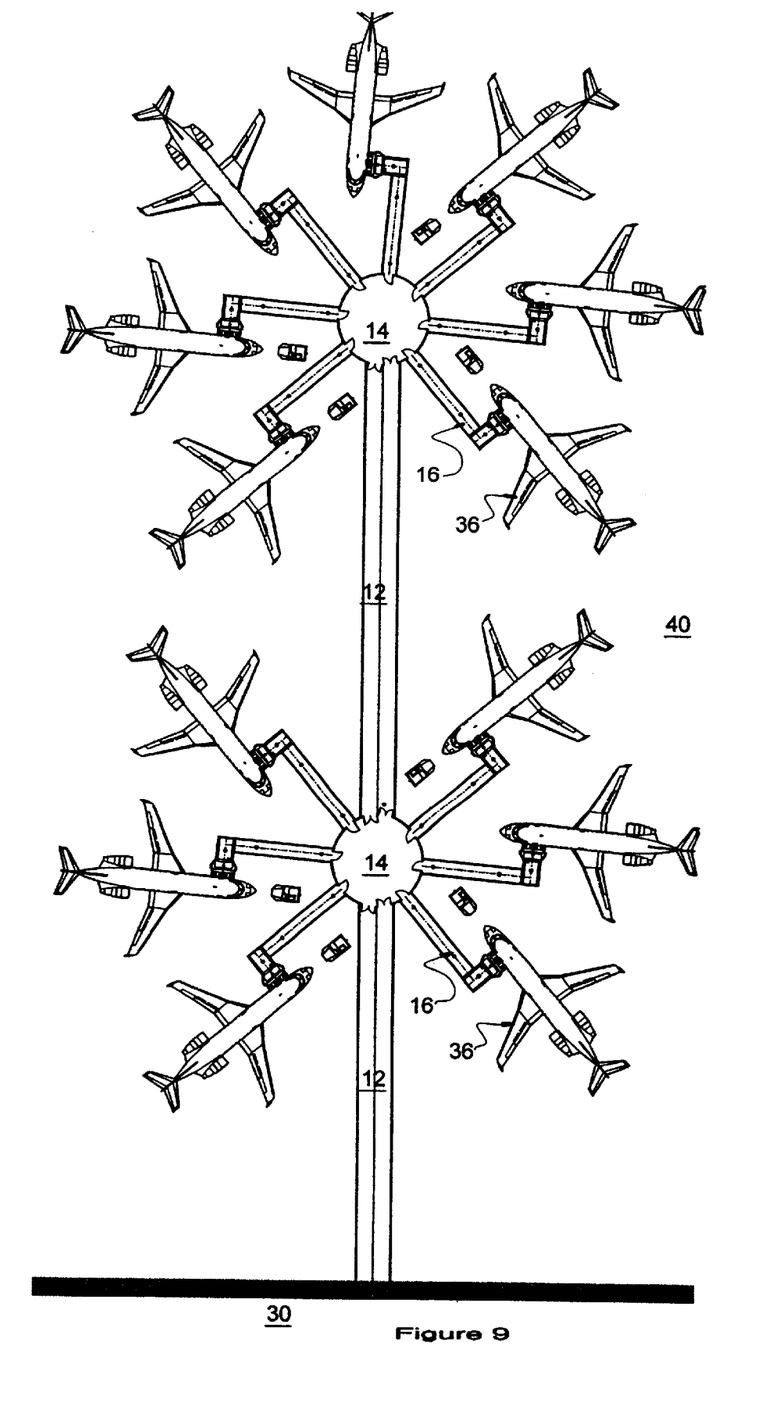
FIG. 9 is a plan view of an embodiment of the present invention in which a second regional aircraft boarding pier is supported by the hub of a first regional aircraft passenger bridge.

FIG. 9. Illustrates another embodiment of the present invention in which multiple hubs (14) are provided as part of a single regional aircraft pier (110). As shown in FIG. 9, a first hub (14A) is connected to an airport concourse (30) by a first primary passenger bridge (12A). A number of secondary passenger bridges (16) extend from the first hub (14A) to dock with regional aircraft (36). A second primary passenger bridge (12B) also extends between the first hub (14A) and a second hub (14B). A second group of secondary passenger bridges (16) extend from the second hub (14B). In this way, a larger number of secondary bridges (16) and docking slips for regional aircraft (36) are provided. Given the space limitations of the particular site in question, any number of additional hubs could be connected by primary passenger bridges (12) according to the principles illustrated in FIG. 9.

A distinct advantage of the present invention is that in each embodiment, the primary regional aircraft passenger bridge (12), the hub (14, 314, 414), and the plurality of secondary regional aircraft passenger bridges (16) are an enclosed space that can be heated or air-conditioned as necessary to enhance passenger comfort. Additionally passengers can quickly transfer between large and regional aircraft without being required to leave the common airport concourse which services both types of aircraft. The passenger can also experience a seamless transition between aircraft where the regional aircraft boarding pier of the present invention is used for transfers between two regional aircraft.

Additionally, the present invention allows the airline staff to be more efficient. As the aircraft are more closely docked, it becomes easier to provide equipment and personnel to service and maintain the aircraft. Consequently, fewer staff are required to service the same number of aircraft. Similarly, the sharing of aircraft support equipment can decrease the overall need for equipment. For example, a single 400 Hz generator could service up to seven regional aircraft or more. Additionally, a single conditioning air unit could service up to seven regional aircraft or more. This shared support equipment could be conveniently housed beneath the hub of the regional aircraft boarding pier (10, 110) of the present invention.

Where a passenger is wheelchair bound, no lift is needed to accommodate boarding and deplaning of a regional aircraft under the principles of the present invention. Additionally, the wheelchair bound passenger can remain in a closed and conditioned space and is not subject to inclement weather or transferring to a remote concourse. Passengers have the same experience transferring between regional aircraft as has conventionally been the case transferring between large aircraft within the concourse system of a major airport. Moreover, the inventive design disclosed herein allows a per passenger seat cost that is competitive with large aircraft boarding bridges.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A regional aircraft boarding pier, comprising:
    a primary passenger bridge extending from an airport terminal or concourse;
    a pier hub connected to the primary passenger bridge; and
    a plurality of secondary passenger bridges connected to, and extending from, said hub, each secondary passenger bridge having a docking end for docking with a regional aircraft.

2. The boarding pier of claim 1, wherein said primary passenger bridge further comprises a divider rail for separating groups of passengers.

3. The boarding pier of claim 1, wherein said hub further comprises an emergency stairway providing egress from said boarding pier.

4. The boarding pier of claim 1, further comprising at least one large-aircraft passenger bridge extending from said hub for docking a large aircraft to said pier.

5. The boarding pier of claim 1, wherein said hub has a circular shape.

6. The boarding pier of claim 1, wherein said hub has a rectangular shape.

7. The boarding pier of claim 6, wherein said rectangular hub has a length and a width, and said length of said rectangular hub is not aligned with said primary passenger bridge.

8. The boarding pier of claim 1, further comprising:
    a second primary passenger bridge extending from said hub;
    a second hub connected to said second primary passenger bridge; and
    a second plurality of secondary passenger bridges connected to, and extending from, said second hub, each such secondary passenger bridge having a docking end for docking with a regional aircraft.

9. The boarding pier of claim 8, further comprising at least one large-aircraft passenger bridge extending from said second hub for docking a large aircraft to said pier.

10. The boarding pier of claim 1, wherein a length and width of said primary passenger bridge are greater than a length and width of said secondary passenger bridges.

11. The boarding pier of claim 1, wherein a pitch of each of said secondary passenger bridges is adjustable so as to position said docking end of any of said second passenger bridges at a door of a regional aircraft being docked.

12. The boarding pier of claim 1, wherein a length of said primary passenger bridge is about 60 feet to about 300 feet.

13. The boarding pier of claim 1, wherein a pitch of said primary passenger bridge is between one foot of rise for every 12 feet of run and level.

14. The boarding pier of claim 1, wherein a width of said primary passenger bridge is about 12 feet to about 20 feet.

15. The boarding pier of claim 1, wherein a length of said secondary passenger bridges is about 20 feet to about 80 feet.

16. The boarding pier of claim 1, wherein a width of said secondary passenger bridge is about 4 feet to about 10 feet.

17. The boarding pier of claim 1, wherein said primary passenger bridge, said hub, and said plurality of secondary regional aircraft passenger bridges are in enclosed, temperature-controlled space.

18. The boarding pier of claim 1, wherein said regional aircraft boarding pier operational footprint occupies an area of about 360 feet by about 360 feet.

19. The boarding pier of claim 1, wherein said regional aircraft boarding pier operational footprint occupies an area of about 150 feet by about 300 feet.

20. The boarding pier of claim 1, wherein said regional aircraft boarding pier occupies an operational building frontage of about 360 feet.

21. An airport terminal including at least one concourse, said terminal comprising:
    at least one large aircraft boarding bridge for docking a large aircraft; and
    at least one regional aircraft boarding pier, said pier further comprising;
        a primary passenger bridge extending from a concourse of said terminal;
        a pier hub connected to the primary passenger bridge; and
        a plurality of secondary passenger bridges connected to, and extending from, said hub, each secondary passenger bridge having a docking end for docking with a regional aircraft.

22. The terminal of claim 21, wherein said large aircraft boarding bridge and said regional aircraft boarding pier are connected to a single, common concourse within said terminal.

23. The terminal of claim 21, wherein said primary passenger bridge further comprises a divider rail for separating groups of passengers.

24. The terminal of claim 21, further comprising at least one large-aircraft passenger bridge extending from said hub for docking a large aircraft to said pier.

25. The terminal of claim 21, wherein said hub has a circular shape.

26. The terminal of claim 21, wherein said hub has a rectangular shape.

27. The terminal of claim 21, further comprising:
    a second primary passenger bridge extending from said hub;
    a second hub connected to said second primary passenger bridge; and
    a second plurality of secondary passenger bridges connected to, and extending from, said second hub, each such secondary passenger bridge having a docking end for docking with a regional aircraft.

28. The terminal of claim 27, further comprising at least one large-aircraft passenger bridge extending from said second hub for docking a large aircraft to said pier.

29. The terminal of claim 21, wherein a pitch of each of said secondary passenger bridges is adjustable so as to position said docking end of any of said second passenger bridges at a door of a regional aircraft being docked.

30. A method of constructing an airport terminal including at least one concourse, said method comprising constructing at least one regional aircraft boarding pier, said pier comprising; a primary passenger bridge extending from a concourse of said terminal; a pier hub connected to the primary passenger bridge; and a plurality of secondary passenger bridges connected to, and extending from, said hub, each secondary passenger bridge having a docking end for docking with a regional aircraft.

31. The method of claim 30, wherein:

said method further comprises removing at least one large aircraft passenger bridge connected to said concourse; and said constructing a regional aircraft boarding pier is performed by constructing said pier where said at least one large aircraft passenger bridge was removed.

32. The method of claim 31, wherein said removing at least one large aircraft passenger bridge comprises removing two large aircraft passenger bridges.

33. The method of claim 30, further comprising constructing at least one large-aircraft passenger bridge extending from said hub for docking a large aircraft to said pier.

34. The method of claim 30, further comprising constructing said hub with a circular shape.

35. The method of claim 30, further comprising constructing said hub with a rectangular shape.

36. The method of claim 30, further comprising:

constructing a second primary passenger bridge extending from said hub;

constructing a second hub connected to said second primary passenger bridge; and constructing a second plurality of secondary passenger bridges connected to, and extending from, said second hub, each such secondary passenger bridge having a docking end for docking with a regional aircraft.

* * * * *